United States Patent [19]

Walker et al.

[11] 4,196,027
[45] Apr. 1, 1980

[54] METHOD OF MAKING FILTER ELEMENTS FOR GAS OR LIQUID

[75] Inventors: Brian Walker, Washington; George S. Hunter; Susanne P. Hunter, both of Houghton-le-Spring, all of England

[73] Assignee: Process Scientific Innovations Ltd., England

[21] Appl. No.: 915,339

[22] Filed: Jun. 13, 1978

Related U.S. Application Data

[62] Division of Ser. No. 779,417, Mar. 18, 1977, Pat. No. 4,111,815.

[30] Foreign Application Priority Data

Mar. 26, 1976 [GB] United Kingdom ............... 12228/76

[51] Int. Cl.² ........................................... B32B 3/10
[52] U.S. Cl. ........................... 156/62.2; 55/524; 55/525; 156/242; 156/285; 210/498; 210/506; 210/508; 210/510; 428/133; 428/140; 428/201
[58] Field of Search ............... 156/62.2, 242, 252, 156/276, 279, 280, 285, 290; 55/524, 525; 210/487, 498, 506, 508, 509, 510; 428/133, 140, 201, 209, 298, 299

[56] References Cited

U.S. PATENT DOCUMENTS

| | | | |
|---|---|---|---|
| 2,054,210 | 9/1936 | Weisenburg | 156/252 |
| 2,417,851 | 3/1947 | Young | 210/508 |
| 2,448,930 | 9/1948 | Stokes | 210/510 |
| 2,700,326 | 1/1955 | Curtis | 210/510 |
| 2,714,349 | 8/1955 | Johnston | 210/498 |
| 3,914,490 | 10/1975 | Fusiek | 428/133 |

Primary Examiner—Caleb Weston
Attorney, Agent, or Firm—Pollock, VandeSande and Priddy

[57] ABSTRACT

A filter element for gas or liquid comprises a layer of glass, ceramic, metal, mineral wool or organic fibres containing, wholly within the layer, an apertured sheet, for example of steel or aluminum, the fibres being bound to one another throughout the layer and through the apertures, as well as to the sheet itself, by a synthetic resin such as silicone resin or polyurethane. The filter element is formed by mounting the apertured sheet a selected distance above a filter surface on which the fibres build up while a slurry containing the fibres is drained through the filter surface. When the fibres have built up to a predetermined distance above the sheet, the fibres containing the sheet are removed and the assembly impregnated with a synthetic resin and cured. Two or more grades of slurry mixture may be used in succession to produce a density grading through the thickness of the fibrous layer. In the case of cylindrical elements, end caps are fitted and made fluid tight by a synthetic resin, a taper fit or a gasket.

10 Claims, 18 Drawing Figures

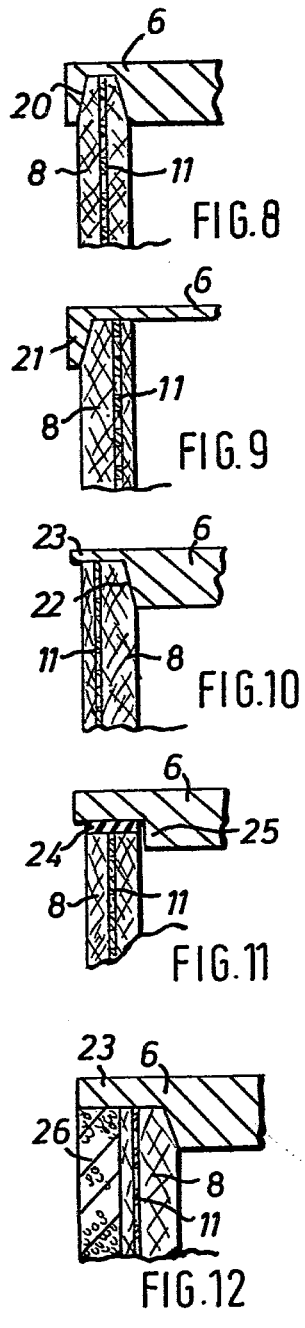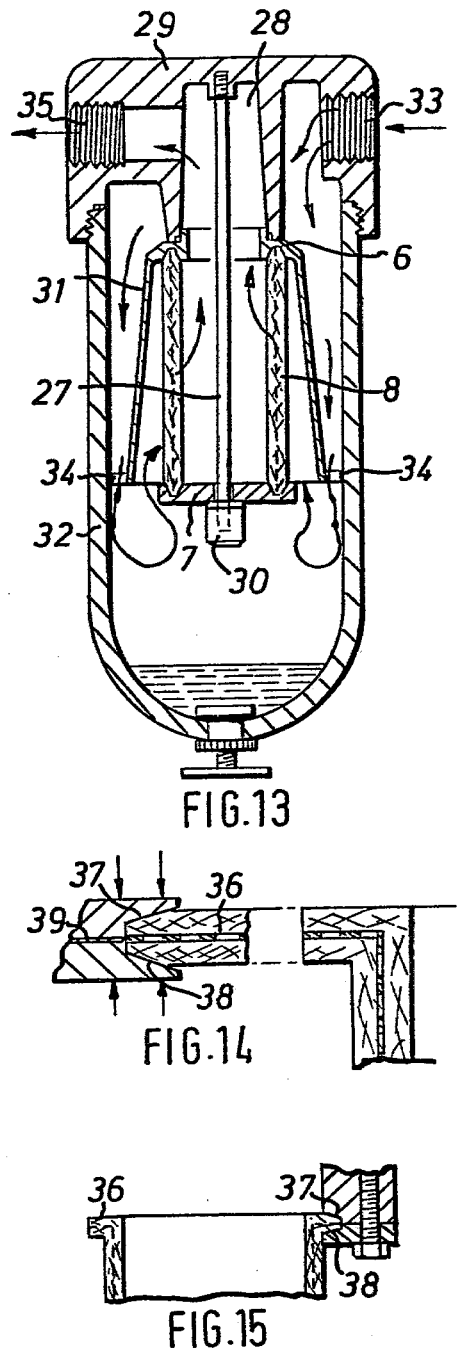

METHOD OF MAKING FILTER ELEMENTS FOR GAS OR LIQUID

This is a division of application Ser. No. 779,417, filed Mar. 18, 1977, now U.S. Pat. No. 4,111,815 issued Sept. 5, 1978.

FIELD OF THE INVENTION

This invention relates to filter elements and to methods of making filter elements of the kind in which fibres bonded together are provided to clean streams of gas or liquid.

One object but not the only object of the invention is to provide means for supporting a high efficiency filter medium consisting of fibres bonded together which, when tested to BS 3928 (sodium flame) will be practically 100% efficient, or in D.O.P. tests with 0.1 to 3 micron particles will give a similar result. However, in practice this efficiency may be varied to suit the conditions for which the filter is designed. The invention is also applicable to filter media having micron ratings of 2, 5, 10, 20 and 50, for example according to the coarseness of the fibres used.

The fibrous filter media produced for achieving these efficiencies are inherently fragile even when resin impregnated, assuming a minimum amount of such binding agent is used. It is, therefore, a further object of the invention to provide a filter element consisting of fibres bound together and to a support which is simple in itself, can, if required, be arranged to enable the flow of fluid through the filter to take place in either direction and enables the binding agent to be economically and efficiently used.

SUMMARY OF THE INVENTION

According to the invention, a filter element comprises a layer of fibres and an apertured sheet of supporting material located within the fibres and substantially co-extensive therewith, the fibres being bound to one another and to the apertured sheet by a synthetic resin.

According also to the invention a method of forming a filter element comprises dispersing a mass of fibres in a liquid to form a slurry, draining the liquid (as by forcing the liquid by means of suction, or pressure, or both) through a filter surface on which the fibres collect while an apertured layer of supporting material is located at a selected distance above the filter surface so that the fibres build up from the filter surface through the apertures in the supporting material to a predetermined distance above the supporting material, removing the collected fibres containing the layer of supporting material from the filter surface, and bonding the fibres to one another and to the supporting material by means of a synthetic resin. The filter surface is preferably provided by a fine mesh membrane. The bonding may be effected by dipping the partly formed element, after drying, into a solution of a synthetic resin and then curing in an oven. This produces a rigid structure strong enough to withstand high pressure differentials and to prevent fibre migration.

DESCRIPTION OF THE DRAWINGS

In order that the invention may be clearly understood and readily carried into effect filter elements, apparatus and methods will now be described, by way of example with reference to the accompanying drawings, in which:

FIGS. 8 to 12 are sectional elevations, analogous to FIG. 6, showing portions of five further forms of end seal for a filter element;

FIG. 13 is a sectional elevation of a filter assembly;

FIGS. 14 and 15 are sectional elevations showing portions of two further arrangements of end seals for filter elements.

Figure 1:
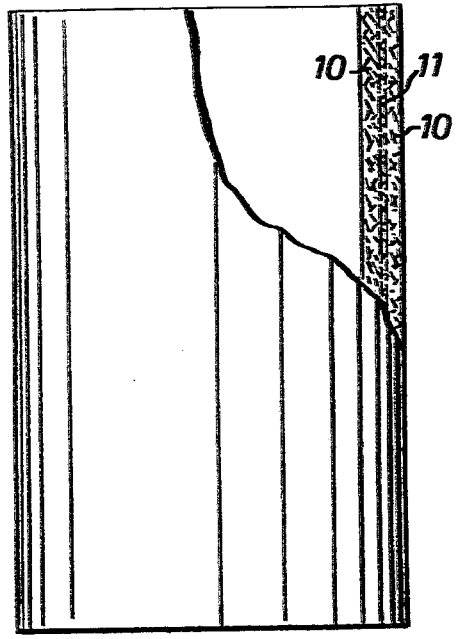
FIG. 1 is an elevation, shown partly in section, of a filter element.
Figure 2:
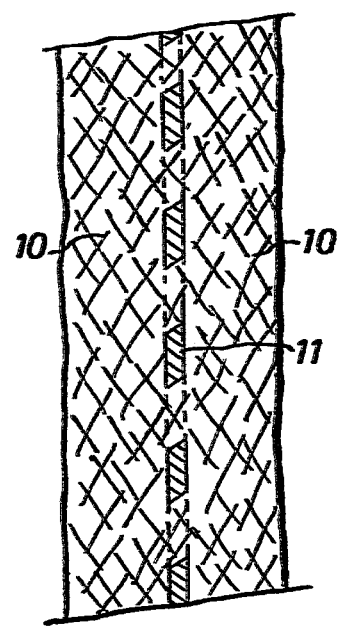
FIG. 2 shows an enlargement of a portion of FIG. 1.
Figure 3:
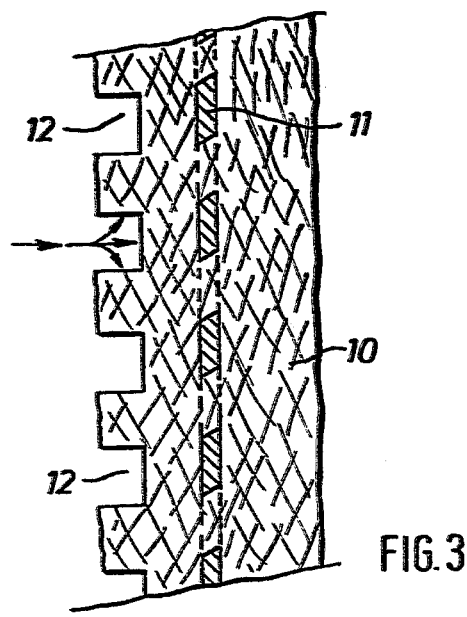
FIG. 3 shows a modification of the filter of FIGS. 1 and 2.

The filter element shown in FIGS. 1 and 2 comprises a filter medium 10 consisting of fibres bonded together by means of a synthetic resin and covering both surfaces of a cylindrical support 11 consisting of expanded or perforated stainless steel, aluminum or other suitable material. The open areas of the support should not be less than 30% of the total area of the support and preferably considerably more, e.g. 50% or more. The support is of far higher mechanical strength than the medium but is preferably designed to provide the minimum of support needed structurally. Preferably also a minimum of resin binder is used to prevent the fibres migrating concomitant with allowing pressure drops of up to 100 p.s.i. across the filter in either direction of flow through the medium. The possibility of arranging the flow to take place in whichever direction may be convenient arises from the location of the support core within the fibres. Particles or aerosol extracted from the fluid being filtered accumulate before they reach the support putting the pressure drop across the filter directly onto the support. The capacity of the filter to hold such trapped particles and the filter life can be increased by increasing the surface area on the face of the medium that receives the contaminated fluid, as by forming one face of the medium with annular grooves 12 as shown in FIG. 3, the depth of the grooves being less than the spacing of the face from the support. For filters of very large diameter an inner support core may be provided.

The fibres may be of glass, ceramic, metal, asbestos, mineral wool or organic fibre. The fibre may be in bulk form before processing and a combination of various fibre materials and fibre sizes may be used. The synthetic resin used for bonding and impregnating is chosen according to the purpose for which the filter is designed having regard to its capacity to withstand water, mineral oils, vegetable oils, synthetic oils, acids and alkalis, also general contaminants found in air, compressed air, vapours, gases and liquids. The synthetic resin that may be used to reinforce and bond the fibres may be a silicone, polyurethane or epoxy or phenolic resin.

Figure 4:
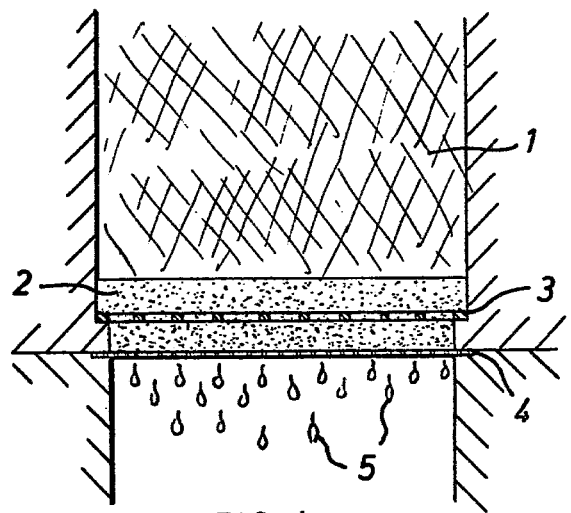
FIG. 4 is a diagrammatic sectional elevation of apparatus for forming a filter element.

FIG. 4 shows diagrammatically a method of building up the fibrous medium on opposite sides of the internal support. This support 3 is detachably mounted in a container at a distance determined by the required thickness of the medium above a fine membrane 4, which may be of "expamet mini mesh" (supplied by Expanded Metal Co Ltd). A slurry 1 is introduced into the container above the support 3. This slurry is formed by mixing bulk fibres, of a size suitable for the use to which the filter is to be put, with predetermined quantities of water and dilute acid to a measured pH value. An exact pH value is necessary to disperse the fibres uniformly throughout the solution while the solution is mechanically agitated continuously. Moreover, the acid tends to etch the fibres giving a better bond during the resin impregnation for reinforcement of the filter. In the case of a slurry of glass fibres the pH value should be substantially 3.

The slurry 1 is forced by vacuum or compression by pump towards the fine membrane 4 where the fibres in suspension are arrested, and build up through the support 3 to form a layer 2 passing through the perforations in the support 3 to a predetermined thickness. The liquid 5 is drawn into another tank for reuse or disposal. The partially formed filter with the support 3 in place is then removed from the container and dried. This initial filter may be disc shaped or concave or convex or it may be a sheet that is then formed into a cylindrical, conical or frusto-conical shape. It may be pleated to provide a comparatively compact filter having a high surface area and of any convenient shape, such as a cylinder. After drying, the filter element is resin impregnated, for example by dipping it into a solution of silicone resin dispersed in toluene. Finally the impregnated filter element after removal from the solution is placed in an oven to cure the resin giving full strength to the filter. Alternatively the synthetic resin used to impregnate the fibres may be polyurethane dispersed in a toluene acetone solution. In this case the impregnated filter is cured in contact with atmospheric air.

In a modification of the above method, two or more grades of slurry mixture are used to produce a density grading. This gives the effect of trapping particles of varying sizes throughout the depth of the filter medium. It also provides improved flow characteristics and a higher dirt-holding capacity, thereby increasing the life of the filter element. The dirt-holding capacity and filter life can also be increased by increasing the area of the surface of the element against which the fluid to be cleaned is directed.

Figure 16:
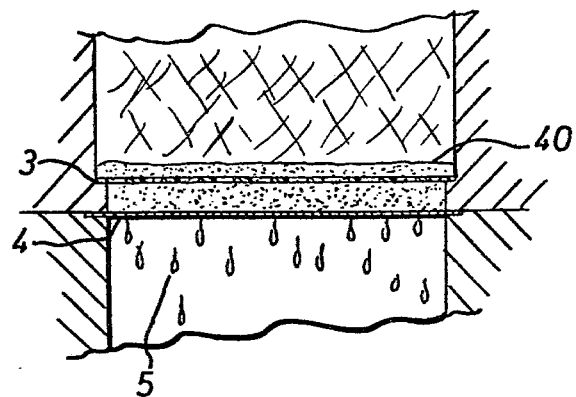
FIGS. 16 to 18 are explanatory diagrams based on FIG. 4, showing a modified way of forming a filter element.
Figure 17:
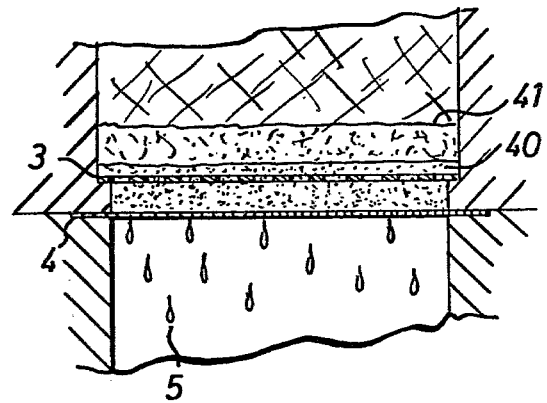
Figure 18:
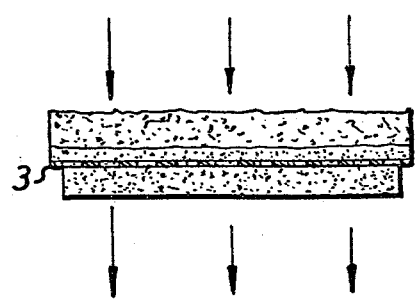

FIGS. 16 to 18 show diagrammatically the formation of a filter element with graded filter media. FIG. 16 shows a layer of filter medium built up to a level 40. Thereupon, a slurry containing coarser fibres is used to build up a layer of coarser fibres to a level 41 (FIG. 17). The final filter is shown diagrammatically in FIG. 18. In use, the fluid to be cleaned passes first through the coarser particles which remove the larger particles contaminating the fluid and then through the finer fibres which remove the smaller contaminating particles. Thus, the smaller or finer the fibres, the higher the efficiency and smaller the particle size retention. In practice, tanks respectively containing the several slurries are used, valves being provided to switch the tanks in succession to the active tank in which the filter element is built up. In FIG. 17 two or more further layers could be built up on the two layers shown.

Figure 6:
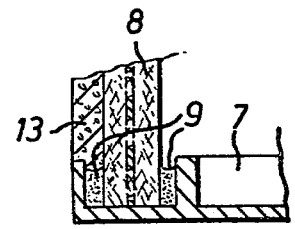
FIG. 6 is an enlargement of a portion of FIG. 5 showing an end seal for a filter element.
Figure 5:
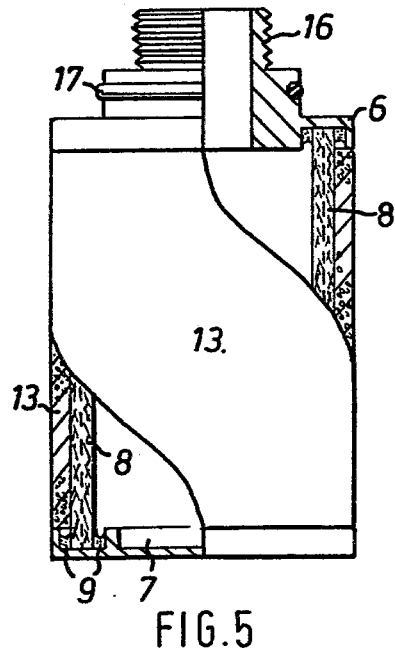
FIG. 5 is an elevation, shown partly in section, of a filter.
Figure 7:
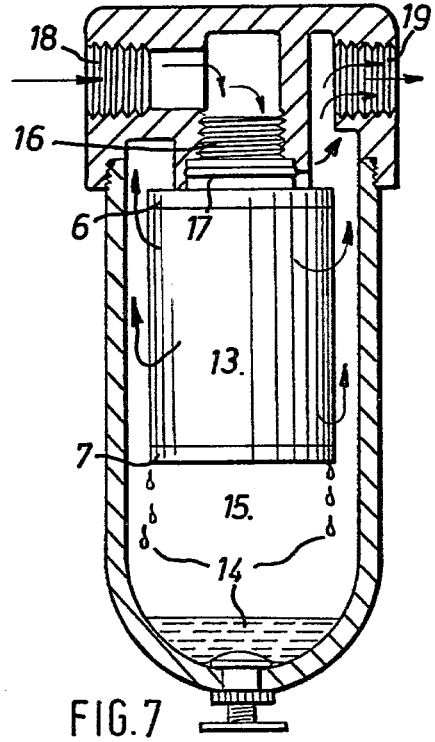
FIG. 7 is a sectional elevation of a housing containing the filter of FIG. 5.

FIGS. 5, 6, 7 show one specific application of a filter element constructed as shown in FIGS. 1 and 2 with the properties required for oil aerosol removal from compressed air. This filter element 8 is sealed into end caps 6, 7 by, for example, epoxy resin 9 which seals through the edge regions of the filter element. For use in ordinary ambient temperatures an outside layer 13 of an open cell polyurethane foam may be added. For elevated temperatures, for example 40° C. to 120° C., this may be replaced by fibrous polyester or nylon. Still higher temperatures may be catered for by other materials such as metal or ceramic fibre. The open cell structure of the outside layer provides a high surface area for drawing coalesced aerosol 14 (FIG. 7) into a quiet zone 15 at the bottom of a housing. The filter is formed with a threaded inlet opening 16 that is screwed into the housing as shown in FIG. 7, an O-ring 17 being inserted to prevent leakage of air between an inlet port 18 and an outlet port 19. The normal flow of the air stream is as shown by arrows. To give higher flow rates, the simple cylinder 8 may be replaced by a cylinder formed with vertical pleats.

Instead of sealing the ends of the filter element 8 into the end caps 6, 7 by means of a material such as epoxy resin, a mechanical joint under axial pressure may be provided by, for example, a taper fit or gasket. Thus, in FIG. 8 an end cap 6 is shown with an annular groove 20 bounded by converging conical surfaces. The top edge of the filter element is initially substantially as wide as the base of the groove and is compressed so as to fit into the groove to the top thereof. The cylindrical support 11 is midway between the inside and outside surfaces of the element.

FIG. 9 shows an end cap 6 formed with a peripheral flange 21 having a conical inside surface with its base diameter substantially equal to the outside diameter of the filter element 8. The top of the filter element is compressed by thrusting it to the top of the conical surface. In this case, the cylindrical support 11 is closer to the inside surface of the filter element than to the outside surface.

In FIG. 10 an end cap 6 is formed with a peripheral conical surface 22 which converges inwards to a diameter substantially equal to the inside diameter of the filter element 8. The filter element is compressed round this conical surface 22 as far as a flange 23. In this case the cylindrical support 11 is closer to the outside surface of the filter element than to the inside surface.

FIG. 11 shows an assembly wherein a rubber gasket 24 is interposed between an end cap 6 and the filter element 8. The gasket may either be bound to the filter element or simply in contact therewith. The filter element and gasket are located by a cylindrical portion 25 of the end cap 6 that projects a little way into the filter element. The support 11 is shown midway between the surfaces of the filter element, which can be mounted for the fluid to flow in either direction through the filter medium.

FIG. 12 shows an arrangement similar to that of FIG. 10, except that the filter element 8 is surrounded by an open pore barrier 26 of a material such as polyester polyurethane foam. This assembly can be used for high efficiency oil removal filtration wherein the air flows from inside the filter to the outside so that the air coalesces and, with water aerosol, is drained away by the barrier 26.

It will be appreciated that the end caps at the opposite ends of the filter elements 8 shown in FIGS. 8 to 12 will usually, in each case, be the same as the end cap shown. The pressure necessary to hold the filter element 8 in the end caps 6, 7 is preferably maintained by a tie rod 27 as shown in FIG. 13. In this case the lower end cap 7 is similar to the end cap 6 of FIG. 8 and the upper end cap 6 is formed with an upstanding circular flange which holds a seal that fits into a cavity 28 formed in an upper member 29 of a housing for the filter element. The tie rod 27 is screwed into the member 29, and passes through a sealed aperture in end cap 7 to receive a nut 30.

The end cap 6 is also formed with a flared skirt 31 forming with the inside surface of a lower member 32 of the housing an annular tapering diffuser for the air entering the duct through an inlet port 33. The air is caused to swirl by vanes 34 and then travels upwards between the skirt 31 and filter element 8 to pass through the filter medium towards an outlet port 35. The diffuser with the swirling action can remove the bulk of liquids from the air before passing through the moulded filter element which, depending on the rating of the fibres, can be formed to remove 2 micron particles and larger particles.

When the filter element consists of a disc or is formed with a peripheral flange 36, as shown in FIGS. 14 and 15, the end of the filter element may be sealed by clamping it between two converging conical surfaces 37, 38. In FIG. 14 a gasket 39 is shown between the members on which these surfaces are formed. In FIG. 15 the surface 38 is shown formed on a member that can serve as a gasket.

The means shown in FIGS. 8 to 15 for sealing the ends of the filter element are suitable for filter media having micron ratings of 1, 2, 5, 10, 20 and 50, according to the coarsness of the fibres used.

We claim:

1. A method of forming a filter element comprising the steps of dispersing a mass of fibres in a liquid to form a slurry, mounting an apertured fibre supporting sheet a predetermined distance above and substantially parallel to a substantially horizontal filter surface, the open areas of said supporting sheet being at least 30% of the total area of said sheet, passing said liquid through said sheet to drain through said filter surface leaving said fibres to build up on said surface, up to and through said supporting sheet to a predetermined distance above said supporting sheet, removing the collected fibres containing said supporting sheet from said filter surface, and bonding the fibres to one another and to said supporting sheet by means of a synthetic resin.

2. A method according to claim 1, in which a pressure difference is applied above and beneath said filter surface to cause said liquid to drain through said surface.

3. A method according to claim 1, in which a fine mesh membrane is used for said filter surface.

4. A method according to claim 1, in which said slurry consists of a series of different slurry portions respectively containing fibres of different degrees of coarseness whereby said collected fibres are caused to build up in strata of fibres of different degress of coarseness.

5. A method according to claim 1, in which said bonding is effected by first drying said collected fibres containing said perforated sheet to provide a partly formed filter element, dipping said partly formed filter element into a solution of synthetic resin, removing from said solution said partly formed filter element when impregnated with said synthetic resin and putting said partly formed filter element into an oven to cure said impregnating synthetic resin.

6. The method of claim 1 wherein said slurry is formed by mixing bulk fibres in a liquid comprising a mixture of water and dilute acid to a measured pH value.

7. The method of claim 6 wherein said fibres are glass fibres and said pH value is substantially 3.

8. A method of forming a filter element comprising the steps of dispersing a mass of fibres in a liquid to form a slurry, mounting an apertured supporting sheet adjacent to and substantially coextensive with a filter surface, the open areas of said supporting sheet being at least 30% of the total area of said supporting sheet, said filter surface being capable of passing the liquid in said slurry therethrough but being incapable of passing the fibres in said slurry therethrough, passing said liquid through said apertured supporting sheet and then through said filter surface leaving said fibres to build up on said filter surface, and into the open areas of said supporting sheet, to a predetermined distance beyond the surface of said supporting sheet remote from said filter surface, separating said supporting sheet with the collected fibres moulded thereon from said filter surface, and bonding the fibres to one another and to said apertured supporting sheet.

9. A method according to claim 8, in which pressure is applied to the slurry to assist in the passage of the liquid through said filter surface.

10. A method according to claim 8, in which said slurry consists of a series of at least two different slurry portions respectively containing fibres of different degrees of coarseness which are fed in succession towards said supporting sheet and said filter surface, whereby strata of fibres of different degrees of coarseness are built up on said filter surface.

* * * * *